(12) United States Patent
Sanghavi et al.

(10) Patent No.: US 9,842,348 B2
(45) Date of Patent: Dec. 12, 2017

(54) TECHNOLOGIES FOR PRESENTING INDICATIONS OF CONTENT FEATURES IN INVITATIONAL CONTENT

(75) Inventors: Mehul K. Sanghavi, Sunnyvale, CA (US); Michael Froimowitz Greenzeiger, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 387 days.

(21) Appl. No.: 13/402,367

(22) Filed: Feb. 22, 2012

(65) Prior Publication Data

US 2013/0219271 A1    Aug. 22, 2013

(51) Int. Cl.
    *G06F 17/00*      (2006.01)
    *G06Q 30/02*      (2012.01)

(52) U.S. Cl.
    CPC .................. *G06Q 30/0251* (2013.01)

(58) Field of Classification Search
    CPC .. G06F 3/4084; G06F 17/3089; G06F 3/0481; G06F 17/212; G06F 17/30905; G06F 17/2235; G06F 17/30899
    USPC ........................................................ 715/273
    See application file for complete search history.

(56) References Cited

U.S. PATENT DOCUMENTS

| | | | |
|---|---|---|---|
| 6,345,279 B1 * | 2/2002 | Li | ..................... G06F 17/30905 |
| 7,580,935 B2 | 8/2009 | Wyllie | |
| 7,930,208 B2 | 4/2011 | Sharman et al. | |
| 2002/0073197 A1 * | 6/2002 | Bhogal et al. | ................ 709/224 |
| 2003/0171991 A1 | 9/2003 | Robbins | |
| 2004/0083291 A1 * | 4/2004 | Pessi | ..................... H04L 65/605 709/227 |
| 2004/0205514 A1 * | 10/2004 | Sommerer et al. | ........ 715/501.1 |
| 2004/0215664 A1 * | 10/2004 | Hennings et al. | ......... 707/104.1 |
| 2008/0072139 A1 * | 3/2008 | Salinas et al. | ................ 715/238 |
| 2008/0299957 A1 * | 12/2008 | Zellner | ..................... 455/414.3 |
| 2009/0106657 A1 * | 4/2009 | Chaudhri | ............ G06F 3/04847 715/716 |
| 2011/0145858 A1 | 6/2011 | Philpott et al. | |
| 2011/0288934 A1 * | 11/2011 | Douceur et al. | ........... 705/14.53 |

* cited by examiner

*Primary Examiner* — Andrew McIntosh
(74) *Attorney, Agent, or Firm* — Polsinelli LLP (57) ABSTRACT

Disclosed are systems, methods, and non-transitory computer-readable storage media for providing a marker with an item of invitational content. A marker provided with an initial view of invitational content communicates features associated with a subsequent view, including the specifications or content of the invitational content, user terminal, or content provider. The marker is determined from input gathered from numerous data sources and according to a set of rules specifying what features and where and how the features are communicated. The rules can dictate that certain variants be selected based on gathered input concerning the user terminal or a user profile. The marker can be determined and changed based on real time status changes of the user terminal. A marker can receive input from the user which can be used to select a variant or change a setting. Marker data is stored and used to create reports and optimize future campaigns.

36 Claims, 7 Drawing Sheets

TECHNOLOGIES FOR PRESENTING INDICATIONS OF CONTENT FEATURES IN INVITATIONAL CONTENT

TECHNICAL FIELD

The present disclosure relates to invitational content and more specifically to markers provided with invitational content.

BACKGROUND

In the modern mobile communication environment, content providers are able to access users in many times and locations, and this constant access can create new tensions. Being able to access people at all times and at all places means that people are sometimes accessed when they are too busy to view content or in a situation which makes viewing content inconvenient. For example, computing devices can have varying specifications and be connected to the internet using connections of varying bandwidths/speeds, and associated charges. This can lead to content being performed inconsistently on a terminal having a low bandwidth/speed connection versus a terminal having a high bandwidth/speed connection. Additionally, when the content includes additional content to be downloaded, such as when a user clicks on an initial view of invitational content which leads to additional views being downloaded, a user might not want to engage with that initial view of the content from fear that a large file will be downloaded which will be associated with a large charge or poor performance of the device.

Further, invitational content may sometimes include features which are inappropriate for a user's setting. For example, a user may not wish to have invitational content including a feature such as sound performed while at church or at work. This can lead to user's selecting content and quickly exiting the content when being presented with a sound due to the undesirable feature. This can have several negative effects for the user including an unsatisfying user experience, and fear of engaging with further unknown content. This can also have a negative effect on the invitational content server which will suffer from reporting of poor metrics because a user click may not actually be associated with any meaningful engagement with the content.

A solution is needed to address these and other issues.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and computer-readable storage media for providing a marker with an item of invitational content. To alleviate the problems discussed above, a marker can be provided with an initial view of invitational content. A marker can be a graphical indicator configured to communicate features associated with a subsequent view of the invitational content to a user. Features associated with a subsequent view of invitational content can be any variety of relevant information regarding the specifications or content of the invitational content. For example, the features might be videos, sound, games, coupons, etc., or might even be used to indicate content categories such as sports, home, family, automobiles, entertainment, kids, etc.

The marker can be presented based on input gathered from numerous data sources. For example, input can be gathered from an item of invitational content, the user terminal, a user profile associated with a user, a content provider, etc.

The gathered input can be used by the content management system or the user terminal to select whether to present the marker according to a set of rules. These rules can specify what features a marker communicates as well as how and where the marker communicates the available features.

In some embodiments, the rules can dictate that certain variants of the invitational content can be selected based on gathered input and the marker can be presented to communicate the selected feature. This can include dictating that a certain variant be chosen based on input gathered concerning the user terminal. For example, a variant of invitational content which does not include video can be selected for display on a user terminal connected via a 3G connection and the marker can communicate that no video is included.

In some embodiments, the rules can dictate that a variant of invitational content be selected based on a user profile associated with a user. For example, a user profile can be created based on a user's previous viewing history in relation to invitational content. The rules can be configured to evaluate the profile data to create assumptions about the likes and dislikes of the user and ensure that variants are selected according to the profile data. For example, the rules can dictate that features assumed to be liked by a user always be included in a marker.

In some embodiments, the marker can be changed in real time in response to a user terminal's status changing. For example, the status of a user terminal can be monitored by the user terminal and the marker can be changed accordingly.

In some embodiments, the marker can be configured to receive input from a user. A marker can include a user interface element such as a button which can receive input from the user. The received input can be used to deliver a chosen variant of the invitational content to the user. In some embodiments, the received input can be used to change a setting on the user terminal.

The features provided to a user via the marker can be used to provide reporting to a content provider. Data regarding the provided features can be stored in a database and used to create reports indicating user response to invitational content based on what features were made aware to a user. This data can be used by a content provider or content delivery system to optimize future campaigns.

BRIEF DESCRIPTION OF THE DRAWINGS

In order to describe the manner in which the advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Figure 1:
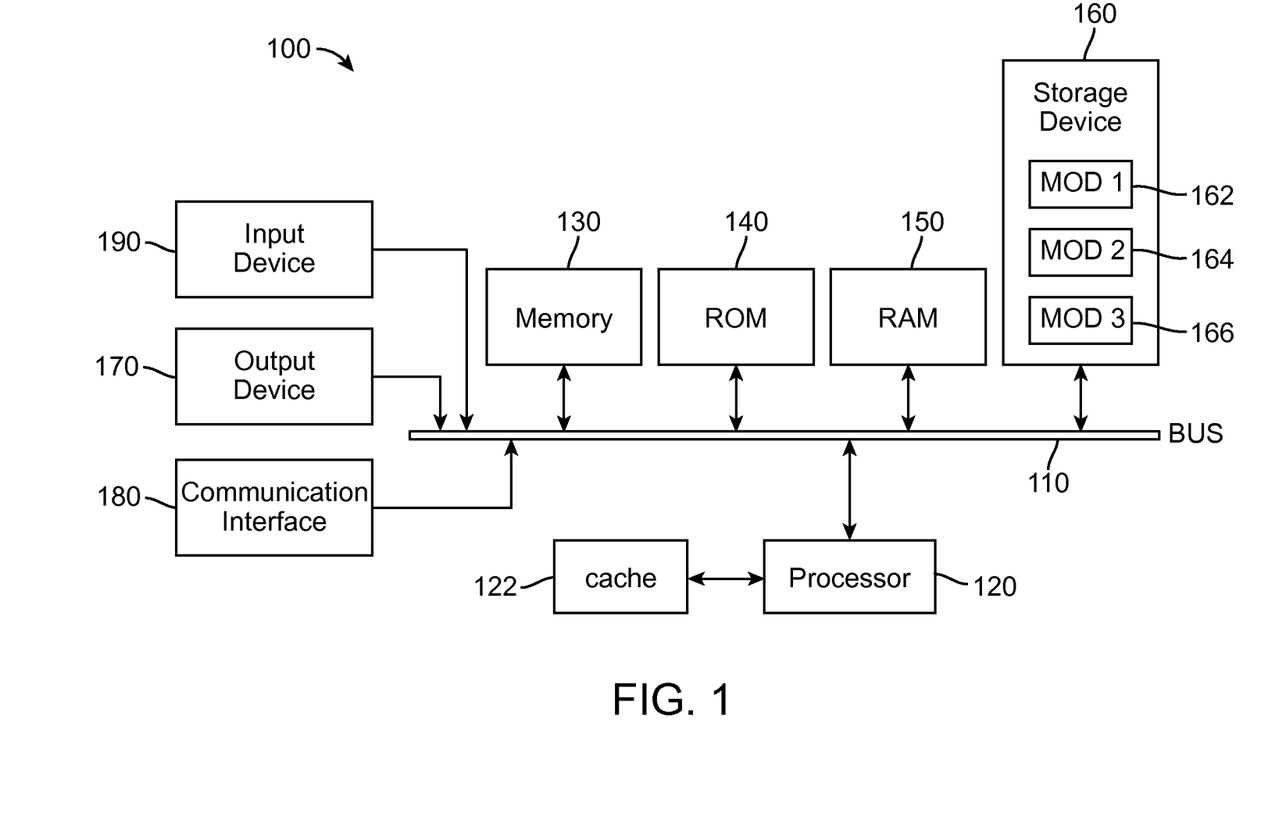
FIG. 1 illustrates an exemplary system embodiment.

FIG. 1 illustrates an exemplary system 100 that includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache 122 provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example, the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Figure 2:
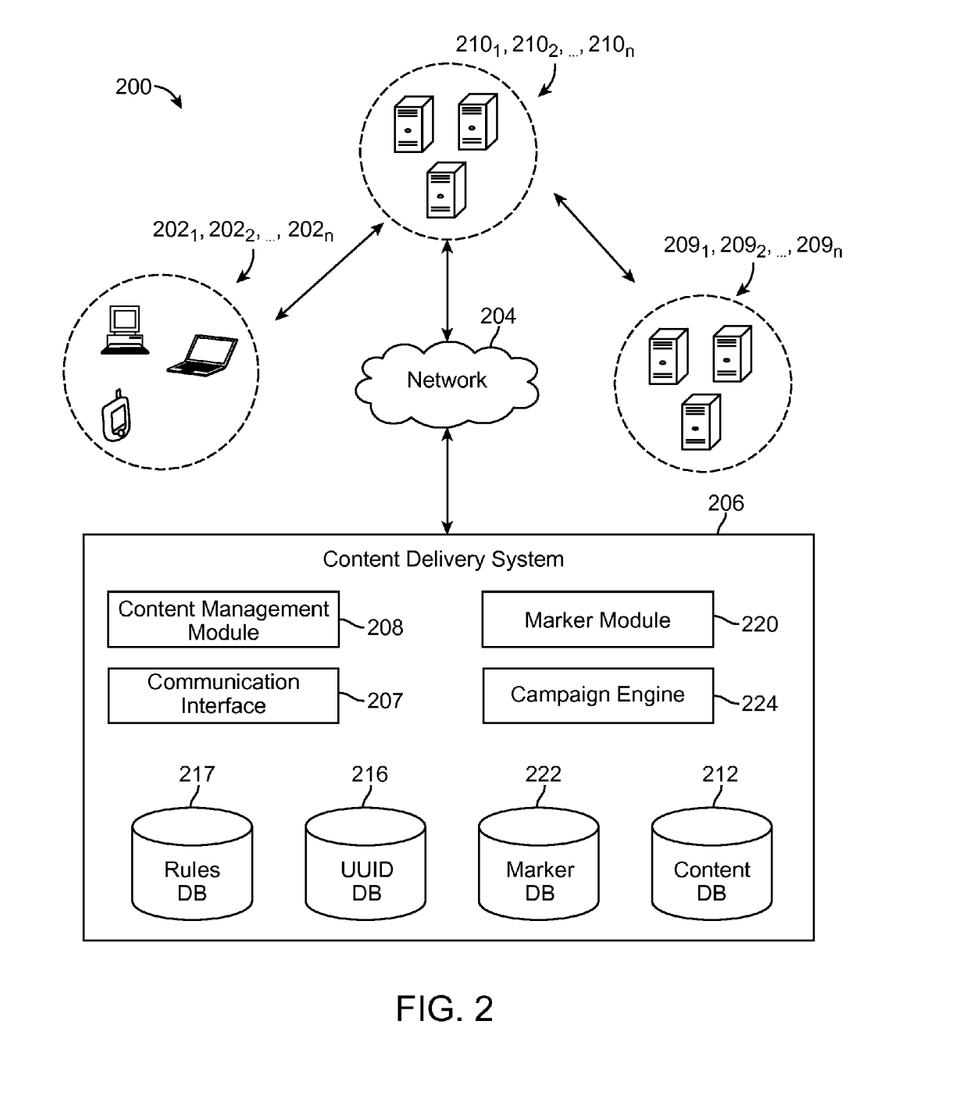
FIG. 2 illustrates an exemplary system embodiment, wherein electronic devices communicate via a network for purposes of exchanging content and other data.

Having disclosed some components of a computing system, the disclosure now turns to FIG. 2, which illustrates an exemplary system configuration 200, wherein electronic devices communicate via a network for purposes of exchanging content and other data. The system can be configured for use on a network 204 such as illustrated in FIG. 2. However, the present principles are applicable to a wide variety of network configurations that facilitate the intercommunication of electronic devices. For example, each of the components of system 200 in FIG. 2 can be implemented in a localized or distributed fashion on a network.

In system 200, invitational content is delivered to user terminals $202_1$, $202_2$, . . . $202_n$ (collectively "202") connected to a network 204 by direct and/or indirect communications with a content delivery system 206. In particular, the content delivery system 206 receives a request for a content package of electronic-invitational content, such as a web page, an application, a game, an advertisement or media, etc., from one of user terminals 202. In the various embodiments, one or more types of invitational content can be combined in a content package. The user terminal 202 can be configured to render the received invitational content. This can include display or playing the invitational content appropriately depending on the form of the invitational content. For example, the invitational content can include text, graphics, audio, video, executable code or any combination thereof. Upon successfully rendering the delivered invitational content, the user terminal 202 can be configured to send a notification to the content delivery system 206. For example, in some embodiments the notification can be a web beacon such as an embedded tracking pixel. In some embodiments, the invitational content can be associated with a product or can directly or indirectly advertise a product. In some embodiments, the content package can be configured to replace or update invitational content in a content package already delivered to the user terminal 202.

Further, the invitational content can be active invitational content—that is—invitational content that is designed to primarily elicit a pre-defined response from the user. For example, active invitational content can include one or more types of advertisements configured to be clicked upon, solicit information, or be converted by the user into a further action, such as a purchase or download of the advertised item. However, invitational content can also include passive invitational content—that is—invitational content that is designed to primarily inform the user. In some cases, passive invitational content can include information that can lead or direct users to active invitational content. Additionally, the invitational content can be dynamic invitational content, which is invitational content that varies over time or that varies based on user interaction with the invitational content. However, the various embodiments are not limited in this regard and the invitational content can be static invitational content that does not vary over time or that varies based on user interaction. In the various embodiments, an invitational content in a content package can be static or dynamic and active or passive. Further, various types of invitational content can be combined in a same content package.

After receiving the request for invitational content, the content delivery system 206 selects the invitational content in response to the request and transmits the assembled invitational content to the requesting one of user terminals 202. In some embodiments, the server has preselected the invitational content before the request is received. Thereafter, the server assembles a content package of invitational content and causes the content package to be delivered to the user. The content delivery system can include a communications interface 207 to facilitate communications with the user terminals 202 and any other components familiar to those of ordinary skill in the art.

The content delivery system 206 includes a content management module 208 that facilitates generation of the assembled content package, which can include invitational content. Specifically, the content management module 208 can combine content from one or more primary content providers $209_1$, $209_2$, . . . $209_n$ (collectively "209") and content from one or more invitational content providers $210_1$, $210_2$, . . . $210_n$ (collectively "210") to generate the assembled content package for the user terminals 202. For example, in the case of a web page being delivered to a requesting one of user terminals 202, the content management module 208 can assemble a content package by requesting the data for the web page from one of the primary content providers 209 maintaining the web page. For the invitational content on the web page provided by the invitational content providers 210, the content management module 208 can request the appropriate data according to the arrangement between the primary and invitational content providers 209 and 210. In some embodiments, device 202 can directly request or already have access to primary content from primary content provider 209. In such embodiments, user terminal (e.g., device) 202 can further request invitational content from system 206. Content Delivery System 206 can identify and deliver invitational content appropriate for association with primary content. For example, primary content such as an application can already reside or be running on a device 202, and primary content can direct device 202 to request invitational content from system 206 to be associated with primary content on device 202.

In some embodiments the invitational content can be structured using a modular approach. That is, rather than requiring that the invitational content provider provide the invitational content as a complete, single unit substantially ready to be delivered, the invitational content can instead be defined as a collection of content blocks that can be assembled by the content delivery system 206 to form the invitational content.

In the various embodiments, the content blocks can include fixed content blocks and variable content blocks. The fixed content blocks can be used to define the general framework or structure for an item of invitational content. The variable content blocks can define the specific content that can be included in the framework. Additionally, the variable content blocks can be configured to allow them to be combined with more than one fixed content block. Thus, the variable content portions can be configured to be interchangeable with respect to each other and with respect to one or more fixed content blocks.

For example, in one configuration, the fixed content blocks for forming items of invitational content can be embodied as a series of templates for rich media advertisements that contain the basic structures possible for various types of advertisements. Such a template could define, for example, if and when videos are to be played, what form a menu of the rich media advertisement could take, and what types of user interactions are possible for navigating through the rich media advertisement. Thus, to form such rich media advertisements, an advertiser could choose the template they prefer for their advertising content and then select which elements (i.e., variable content blocks) would be combined with the template. Such a configuration allows the advertiser to define a specific configuration for their electronic advertisement.

The interchangeability of the fixed and variable content blocks also allows for multiple variants of the invitational content to be provided to a user terminal. For example, multiple fixed and variable content blocks can be provided by an advertiser which can be mixed and matched to create multiple variants of the same item of invitational content. By varying the fixed and variable content blocks, variants of invitational content can be created wherein certain variants include certain features while others do not. For example, one variant can include video while another includes only static images. Further, this allows invitational content to be created which is optimal to certain environmental factors. For example, invitational content can be optimized for user terminals using high or low bandwidth.

As described above, content maintained by the content providers 209 and 210 can be combined according to a predefined arrangement, which can be embodied as a set of rules. In an arrangement where the content delivery system assembles the content package from multiple content providers, these rules can be stored in a rules database 217 in content delivery system 206 and content management module 208 can be configured to assemble the content package for user terminals 202 based on these rules. The rules can specify how to select content from secondary content providers 210 and the primary content providers 209 in response to a request from one of user terminals 202. For example, in the case of a web page maintained by one of primary providers 209 and including variable advertisement portions, the rules database 217 can specify rules for selecting invitational content from one of the secondary providers 210. The rules can also specify how to select specific content from the selected one of secondary providers 210 to be combined with the content provided by one of primary providers 209.

In some embodiments, the rules can further specify which markers to include with an initial view of invitational content. Further, the rules can also dictate how to combine fixed and variable content blocks to form items of invitational content when invitational content is provided in a modular manner. The rules can be used to dynamically configure or reconfigure an item of invitation content depending on various factors addressed herein.

Once assembled, the assembled content package can be sent to a requesting one of user terminals 202. However, the content package is not limited to the content from content providers 209 and 210. Rather, the content package can include other data generated at the content delivery system 206.

In some embodiments the invitational content can be configured at a user terminal 202 rather than at the content delivery system 206. For example, the content can be delivered to the user terminal 202 in a modular form, or with features that can be enabled/disabled and then configured at the user terminal 202 with the appropriate features included/enabled/disabled. This can include sending the primary and secondary content to the user terminal 202 whole or in a modular manner. The content can then be assembled according to rules, similar to when assembled at the content delivery system. In some embodiments the rules can be accessed from the rules database 217 on the content delivery system 206 via the communication network 204. In some embodiments the rules can be transmitted with the unassembled invitational content, for example, as metadata. In some embodiments the rules can be stored locally on the user terminal 202.

Although primary and invitational content providers 209 and 210 are presented herein as separate entities, this is for illustrative purposes only. In some cases, the primary and invitational content providers 209 and 210 can be the same entity. Thus, a single entity can define and provide both the primary and the invitational content.

Although the content management module 208 can be configured to request that content be sent directly from content providers 209 and 210, a cached arrangement can also be used to improve performance of the content delivery system 206 and improve overall user experience. That is, the content delivery system 206 can include a content database 212 for locally storing/caching content maintained by content providers 209 and 210. The data in the content database 212 can be refreshed or updated on a regular basis to ensure that the content in the database 212 is up-to-date at the time of a request from a user terminal. However, in some cases, the content management module 208 can be configured to retrieve content directly from content providers 209 and 210 if the metadata associated with the data in content database 212 appears to be outdated or corrupted.

In the various embodiments, the content delivery system 206 can also include a unique user identifier (UUID) database 216 that can be used for managing sessions with the various user terminal devices 202. The UUID database 216 can be used with a variety of session management techniques. For example, the content delivery system 206 can implement an HTTP cookie or any other conventional session management method (e.g., IP address tracking, URL query strings, hidden form fields, window name tracking, authentication methods, and local shared objects) for user terminals 202 connected to content delivery system 206 via a substantially persistent network session. However, other methods can be used as well. For example, in the case of handheld communications devices, such as mobile phones, smart phones, tablets, or other types of user terminals connecting using multiple or non-persistent network sessions, multiple requests for content, as well notifications that the content has been successfully rendered, from such user terminals may be assigned to a same entry in the UUID database 216. The delivery system 206 can analyze the attributes of requesting devices to determine whether such requests can be attributed to the same user. Such attributes can include device or group-specific attributes.

The data gathered in the UUID database 216 can also be configured to form a user profile. For example, all content requests and received notifications received from a user associated with a UUID can be stored and related to each other. The user profile can thus provide a complete history of all content requested by and successfully delivered to a specific user.

In addition to delivering invitational content, the content delivery system 206 can also be configured to provide the user with information identifying "features" associated with a subsequent view of the item of invitational content. Features can include any type of information related to the invitational content or rendering of the invitational content on the user terminal 202. For example, features can include technical specification of the item of invitational content such as, whether the invitational content includes sound or video, whether an internet connection is required or if the invitational content is Wi-Fi optimized, and what orientation the content can be presented in (portrait or landscape), etc.

In some embodiments, features can include information about the content of the invitational content, such as whether it is an advertisement, game, application, etc. This can also include what languages the invitational content is offered, a genre or parental rating associated with the invitational content, the length or format of the content, etc.

In some embodiments, features can include instructions associated with the invitational content such as indicating swipe motions that can be used in a game or other application.

In some embodiments, features can include special offers associated with the invitational content. For example, that the invitational content includes a free download such as a free song, game or video. Additionally, features can include whether the invitational content includes a downloadable coupon or redemption code which can be redeemed by the user.

In some embodiments, features can indicate details about the user terminal in relation to rendering the invitational content. This can include hardware specifications of the user terminal such as the size of screen, resolution, processor speed, available memory, whether it has a touch screen, whether it has a gyroscope, etc. This can also include the current state of the user terminal such as whether the user terminal is connected to an internet connection, the current bandwidth of the connection, location or the current permission settings associated with the terminal. In some embodiments, features can include information regarding the software running on the user terminal such as the current operating system, other programs installed on the terminal, and compatible formats.

Features can also include information about the content provider providing the invitation content such as the specific content provider, how long the content provider is offering the invitational content, what data the content provider will gather if the invitational content is rendered, etc.

Features can also include information pertaining to the user, such as the user has previously shown an interest in similar invitational content. For example, features can include information that an item of invitational content includes a coupon or is regarding a certain subject which the user has previously shown an interest in.

Features can be communicated to a user through use of a marker. For example, the content delivery system can include a marker module 220 configured to provide a marker to the user terminal 202 along with an item of invitational content. A marker can be any type of graphical indicator configured to communicate information. As an example, an item of invitational content can be a banner advertisement that, when selected, provides the user with an advertisement including video and sound. A user may not wish to view this advertisement because the user is, for example, on a cellular phone using a low bandwidth connection, or in a setting in which sound is inappropriate, such as at a library. A marker provided with the banner can communicate that the invitational content includes the features of sound and video, so that if the invitational content is selected, the user will be displayed an advertisement containing both video and sound. This allows the user to make an informed decision on whether to select the banner advertisement.

A marker can be presented in numerous forms and can use any variety of methods to communicate information to a user. For example, a marker can be presented as a graphical element portrayed near the invitational content or the marker can be incorporated as part of the invitational content itself. The marker can communicate information by including, for example, an image or text. In some embodiments, graphical images such as icons can be used to represent information. In some embodiments, text can be used to convey information to the user, or a combination of text and images.

Figure 3A:
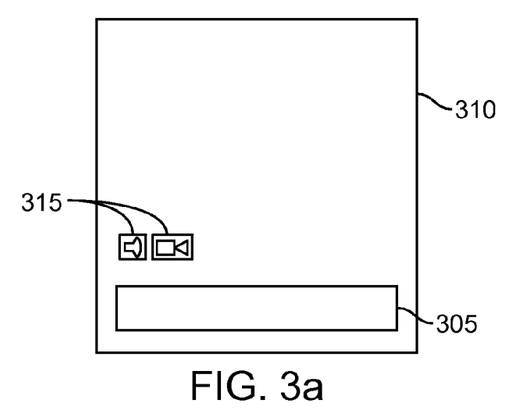
FIGS. 3a, 3b, 3c, and 3d illustrate exemplary embodiments of a marker displayed along with invitational content illustrations.

FIGS. 3*a*, 3*b* and 3*c* illustrate exemplary embodiments of a marker displayed along with invitational content. As illustrated in FIG. 3*a*, the invitational content 305 can be a displayed at the bottom of the screen 310 and the marker 315 can be provided above it as a graphical element. In this embodiment, images are used to indicate the contents of the invitational content. As illustrated, an image of a speaker and a video camera are used to communicate that the invitational content 305 contains sound and video.

Figure 3B:
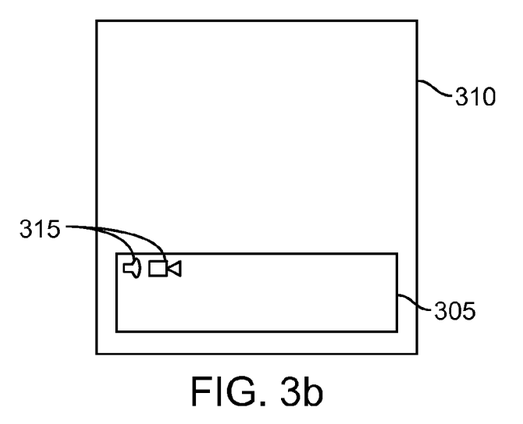

FIG. 3*b* illustrates an embodiment in which the marker 315 is incorporated into the invitational content 305. As illustrated, illustrations of a speaker and video camera are displayed within the invitational content 305 to communicate that the invitational content contains both sound and video.

Figure 3C:
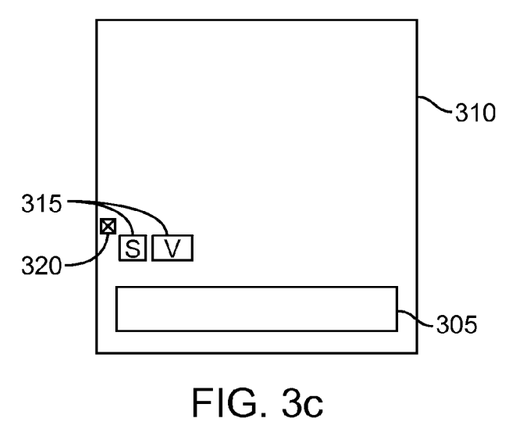

FIG. 3*c* illustrates an embodiment in which text 315, rather than illustrations, is used to communicate information about the invitational content 305. As illustrated, the letters 'V' and 'S' are displayed within graphical elements to communicate that the invitational content contains both video and sound. These are just examples and are not meant to be limiting. One skilled in the art would recognize that any number of formats or combination thereof can be used to represent the information and that the marker can be placed in any number of locations. A marker can also be configured so that a user can select to dismiss the marker. For example, a marker can include an user interface element that, when selected, can remove the marker or, alternatively, minimize the marker. For example, as illustrated, a user interface element 320, can be included with the other elements of the marker 315. The user interface element 320 can be a button that, when selected, results in the remaining portions of the marker 315, being removed from the screen. In some embodiments the user interface element 320, can be removed in addition to the marker 315 when the user interface element 320 is selected. In this type of embodiment, once removed, the marker would be completely removed from the invitational content. In some embodiments, the user interface element 320 can remain after the marker 315 is removed and the user interface element 320 can be configured so that if it is selected again, the marker 315 would reappear with the item of invitational content.

Figure 3D:
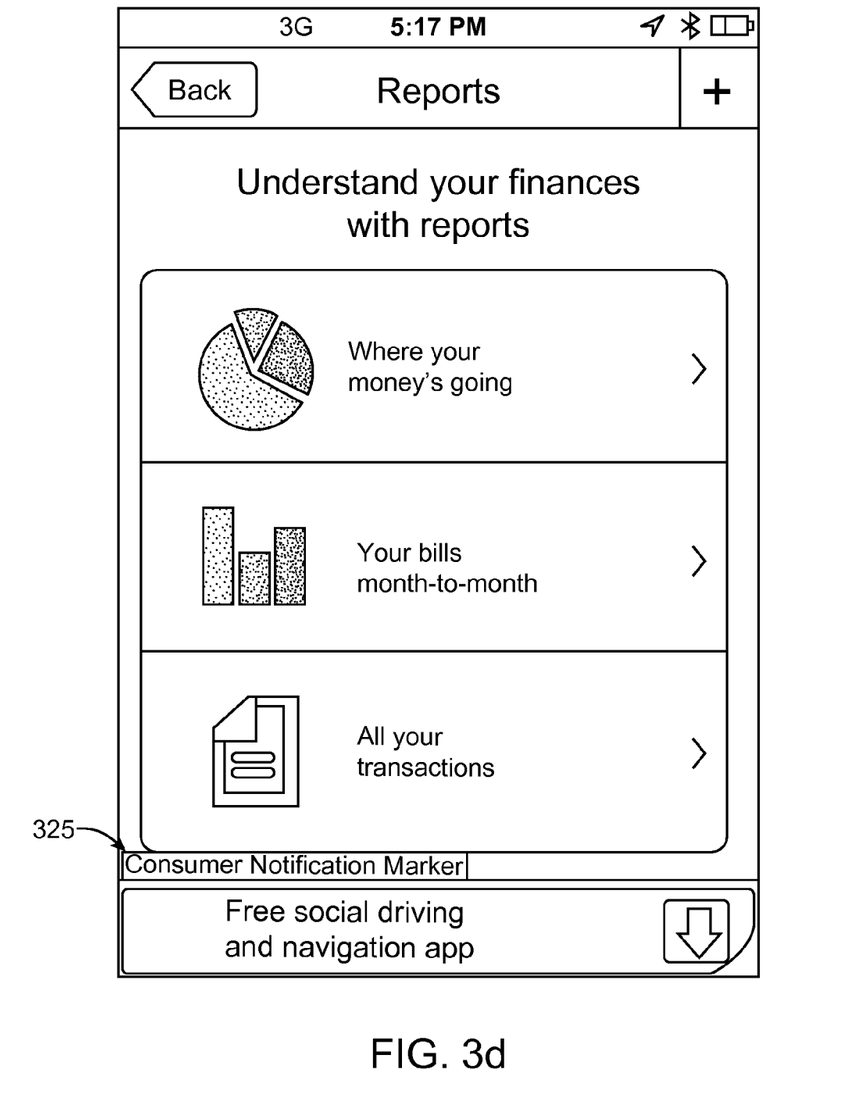

FIG. 3*d*. illustrates an embodiment in which a notification is provided to let the user know that markers are available. Notification 325 can be selectable by a user, and upon selection can reveal markers such as those exemplified in FIGS. 3*a*, 3*b*, and 3*c* addressed above. The marker placements, as shown, are for illustrative purposes only. One skilled in the art would recognize that the marker can be presented in any number of possible locations. For example, in some embodiments the markers can be presented in a permanent location such as the header bar.

Figure 4:
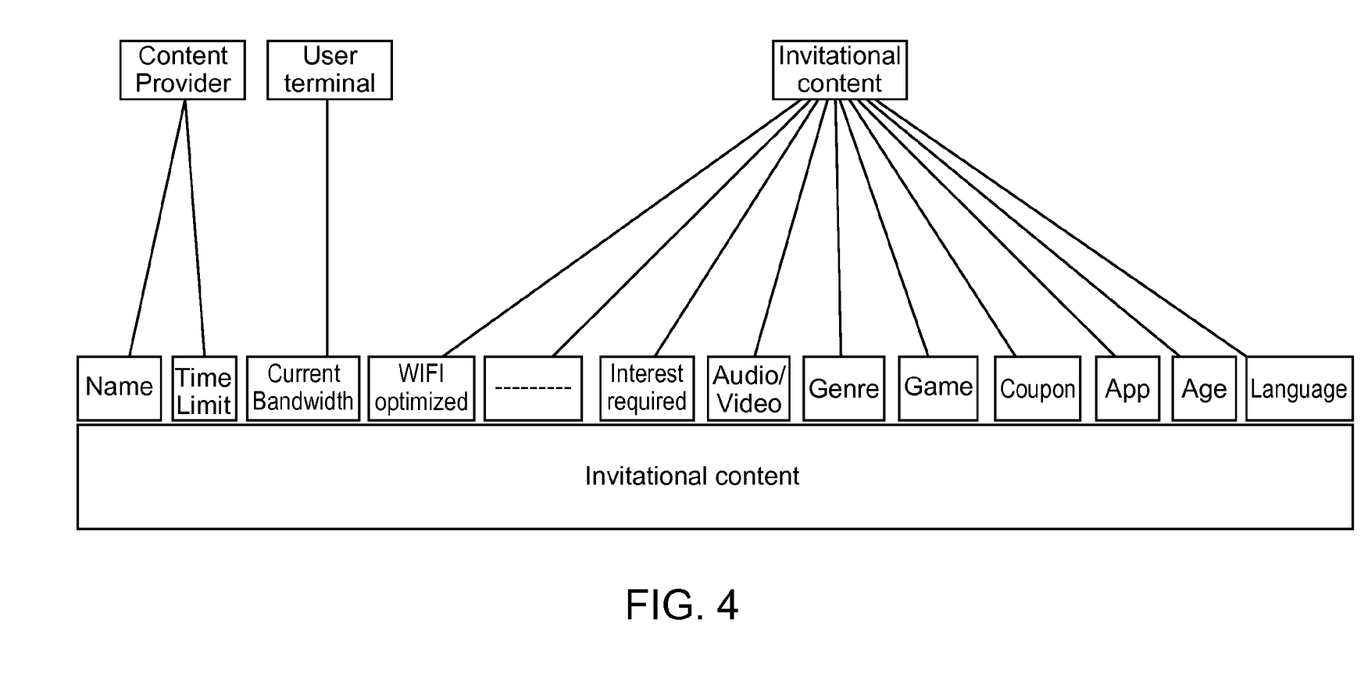
FIG. 4 illustrates exemplary inputs that can be gathered from different data sources.

Returning to FIG. 2, the marker module 220 can be configured to gather input from multiple data sources such as those illustrated in FIG. 4. For example, the marker module 220 can be configured to gather input from an item of invitational content, a content provider 209 and/or 210, a user terminal 202, a database, or any other relevant data source available to the marker module 220 via the communication network 204. This information can be used to determine the features present in an item of invitational content, and whether or not to make those features available when the invitational content is presented to/on a device 202.

The marker module 220 can be configured to gather input in any number of ways. For example, the marker module 220 can be configured to gather input from an item of invitational content by analyzing the code associated with the invitational content prior to delivery of the invitational content. Alternatively, in some embodiments the invitational content can contain metadata that describes the content and the input can be gathered from the metadata.

Data gathered from data sources in network communication with the content delivery system 206, such as content providers 209 and 210 and the user terminal 202, can be received over the communication network 204 via the communication interface 207. This data can be requested by the marker module 220 as input, or in some embodiments, the data can be automatically transmitted, for example, via a communications feed in network communication with the content delivery system 206.

FIG. 4 illustrates exemplary input that can be gathered from different data sources. As illustrated, data that can be gathered from an item of invitational content can include technical specifications or features such as, sound, video, internet required, Wi-Fi optimized, orientation, etc.

Input gathered from an item of invitational content can also include information about the content of the invitational content such as available languages, appropriate age, rating, whether the content is, or includes, an application, movie or advertisement, coupon or free download, instructions, etc.

In some embodiments input can be collected from a user terminal and used to determine whether or not to enable features available in the invitational content. For example inputs collected from a user terminal can include the UUID associated with the device, hardware specifications such as the size of screen, resolution, processor speed, available memory, touch screen, gyroscope, etc., and the current state of the user terminal such as whether the user terminal is connected to an internet connection, its current bandwidth, current permission settings, location, volume setting, software running, etc.

Input collected from a content provider can include the name of the content provider, how long content will be provided by the content provider, what information will be gathered, etc.

Returning to FIG. 2, the marker module 220 can also be configured to gather input from a database. For example, the marker module can be configured to use the UUID gathered from a user terminal 202 to access the UUID database 216 and gather input regarding the user's previous history with invitational content. In some embodiments, the marker module 220 can be configured to gather data from a database stored on a $3^{rd}$ party server in network communication with the content delivery system 226. For example, a cloud-based user profile can be accessed via the communication network 204 to gather input regarding a user such as user preferences.

The marker module 220 can further be configured to store the gathered input in a marker database 222. The gathered input can also be associated with data from other databases such as the UUID database 216. For example, in some embodiments, input gathered from a user terminal 202 can be associated with the user profile created for that UUID in the UUID database 216. In some embodiments, input gathered from an item of invitational content and a content provider can be associated with the UUID database 216. For example, all gathered input can be associated to a user's profile in the UUID database 216 so that, in addition to the history of what invitational content has been requested and received by a user, data regarding the individual items of invitational content, the content provider 209 and/or 210 of each item invitational content, as well as information about the user terminal 202 the item was delivered to, can all be accessed and associated to a single user. Although illustrated as a separate database, the marker database 222 can be a part of another database such as the UUID database 216 or the rules database 217.

The marker module 220 can also be configured to use the gathered input to determine a marker to be provided with an item of invitational content. The marker can be determined according to a predefined arrangement which can be embodied as a set of rules. These rules can be stored in the rules database 217 and the marker module 220 can be configured to determine the marker based on these rules.

These rules can specify what features a marker communicates. For example, in some embodiments, the rules can dictate that the marker be determined so that each gathered input is communicated to the user in the marker, using, for example, an image or text. In some embodiments, it may not be reasonable or possible to always communicate each gathered input because of the high number of input gathered and/or the limited available space allotted to the marker, so the rules can dictate a maximum number of input or marker images that can be communicated per item of invitational content. In some embodiments, the rules can rank certain features higher than others so that only the features deemed to be most important and/or relevant will be included.

In addition to what features are communicated, the rules can also dictate how the features are communicated. This can include what symbols and/or text are to be used to communicate features and where the symbols and/or text should be located in relation to the invitational content.

In some embodiments, this can also include where the symbols and/or text are located in relation to each other so that a user can easily evaluate the features communicated by the marker.

In some embodiments, markers can be used to reveal minimum or recommended system requirements so that the user can quickly and easily determine whether their user terminal 202 meets the requirements for performing the invitational content. An example of this can be placing the feature that a Wi-Fi connection is recommended when rendering the invitational content next to the feature that the user terminal 202 is currently connected via a 3G connection.

The rules can also be configured to take into account a user's profile and previous history. For example, if a user has a consistent history of responding to invitational content with a specific feature, the rules can dictate that, when an item including that feature is delivered to the user, the informing of the user of the presence of that feature should occur. For example, a user may have a history of consistently selecting invitational content that includes coupons, based on this information, the rules can dictate that a marker always communicate when an item of invitational content includes a coupon when delivered to the user.

In some embodiments, the rules can be based on the user's selection. For example, in some embodiments a user can set their preferences using a system control panel or setting interface. A user can determine what features to show or hide in the marker. For example, an adult user may not care about content ratings and thus may choose to disable or hide this information from being presented in the marker. In some embodiments the user can rank features in the system control panel so that when space is limited, the user will be presented with the markers most important to the user.

Once a marker has been determined, the content delivery system 206 can be configured to deliver the marker to the user terminal 202 along with the item of invitational content. The marker can be sent via the communication network 204 using the communication interface 207. Further, data regarding what information is communicated in each marker can be stored in the marker database 222 and associated with the user profile of the UUID of the receiving user terminal 202. This way the user profile can reflect not only what invitational content is being delivered to a user, but also what features are communicated to the user prior to selection of the invitational content. The marker can be rendered asynchronously with the launch of the invitational content. This way the user is presented with early knowledge of the features of the marker, including technical constraints, prior to launching the invitational content.

In some embodiments the marker module 220 can be present on the user terminal 202 instead of, or in addition to, the content delivery system 206 and so the marker can be determined at the user terminal 202 rather than at the content delivery system 206. For example, the content delivery system 206 can be configured to send the requested invitational content to the user terminal 202 as well as the gathered input regarding the invitational content. The marker module 220 present on the user terminal can then determine the marker at the user terminal 202 according to the rules in the rules database 217 (which can also be located on the user terminal, in whole or in part). In some embodiments the rules can be sent along with the item of invitational content, for example, as metadata. In some embodiments the rules can be accessed by the user terminal 202 from the rules database 217 on the content delivery system 206 by use of the communication network 204. In some embodiments the rules can be stored locally on the user terminal 202.

In addition to communicating information to a user, the marker module 220 can also configure a marker to receive information from a user. For example, the marker can include interactive graphical elements such as graphical user interface buttons that can be configured to receive input from a user as well as communicate information. The received input can then be used in conjunction with the rules to, for example, select an appropriate variant of the invitational content offered by the content provider 209 and/or 210. For example, a content provider 209 and/or 210 may offer multiple variants of an item of invitational content. A marker can be configured to communicate the variants of the invitational content to the user and can also be configured to receive input from a user concerning the user's preference as to which variant he prefers to receive. The received input can then be used in conjunction with the rules for assembling invitational content to provide the selected variant of invitational content to the user terminal 202.

For example, in some embodiments where the invitational content is delivered in a modular manner, the marker can be configured to communicate the variant features offered by the available fixed and variable content blocks. The received input can also be stored in the marker database 222 and be related with the user profile associated to the UUID of the user terminal 202 and used in making further decisions regarding selecting invitational content to deliver to the user terminal.

In some embodiments the received user input can be used to change a setting on the user terminal 202. For example, a marker communicating that an item of invitational content includes sound can be configured to receive a user input that mutes sounds or changes the volume level. The received input can also be stored in the marker database 222 and related with the user profile associated to the UUID of the user terminal 202.

In some embodiments, the rules can be configured to automatically assemble a variant of an item of invitational content based on input gathered from a user's profile. For example, patterns detected in a user's profile can be used to assume likes and dislikes associated with the user. Based on these assumptions, certain variants of invitational content can automatically be provided to a user. For example, if based on a user's previous history, it is determined that the user often responds to invitational content including a downloadable coupon, which the user can have known before she clicked on the invitational content because it is indicated with a marker, a variant of invitational content including a coupon can automatically be provided, when available. Alternatively, if based on user history it is assumed that a user does not like invitational content including sound, a variant of the invitational content that does not include sound can be automatically provided to the user, when available.

Any method known in the art can be used to create assumptions about a user. For example, in some embodiments an assumption can be based on a user selecting or not selecting a certain number of items of invitational content that includes a certain attribute. In some embodiments, the assumption can be based on previous input received from the user through use of interactive markers.

In some embodiments, the assumption can be based on a user responding to a predetermined percentage of invitational content including a particular attribute. For example, if a user selects statistically significant number of items of invitational content that include a certain attribute while not selecting items (or selecting less often) that do not include the attribute, it can be assumed that the user likes that attribute.

In some embodiments, the assumption can be based on a user's percentage of selection of invitational content with a specific attribute versus an overall selection rate. For example, if a user selects 30% of all delivered invitational content, a user can be assumed to like a certain attribute if they select items of invitational content including that attribute at predetermined rate above their overall selection rate.

In some embodiments, the gathered input can be used in determining what further invitational content to be downloaded. For example, the rules can be configured to dictate that, upon a user selecting the item of invitational content, certain additional content should be optimistically preloaded. For example, the additional content can include subsequent content which a user might be likely to navigate to.

In some embodiments the rules can be configured to evaluate the gathered input in determining which variant of content to load. For example, if input gathered from the user terminal indicates that the user terminal is connected via a low bandwidth connection, the rules can dictate that variants of the content which do not include video should be downloaded.

In some embodiments the content delivery system 206 can include a campaign engine 224 to manage and evaluate the performance of campaigns for delivering invitational content. The campaign engine 224 can be configured to communicate with the UUID database 216 and the marker database 222 to review data regarding delivered invitational content. This can include reviewing the data to determine user responses to delivered invitational content. This evaluation can be done by examining the population of users as a whole, subset, or individually. For example, the campaign engine 224 can determine what percentage of user's as a whole responded to certain items of invitational content. Alternatively, the campaign engine 224 can also evaluate how a subset of users, such as users viewing the invitational content on a particular type of user terminal or connected via a certain type of connection responded to delivered invitational content. This evaluation can also be done on a user-by-user basis.

The campaign engine 224 can also take into account what information was communicated to a user via the marker when evaluating user response to invitational content. This allows the campaign engine 224 to evaluate user response based on informed decisions by users. In the past, user response was based only on what was presented by the invitational content, the user had no way of knowing anything else about the invitational content or how the content would perform on their user terminal 202. As a result, users sometimes clicked on invitational content which could not be properly rendered on their user terminal, or did not click on invitational content which they would have, had they known more about the contents. This caused users to immediately exit the selected invitational content and resulted in inaccurate performance statuses being reported. The present technology, therefore, reduces error and presents a much more accurate representation of a user's true response to invitational content since the response is an informed decision rather than a guess as to what the invitational content includes or how it will perform.

The campaign engine 224 can also evaluate how users responded to invitational content based on what information that was presented to them and determine trends. This can include what information, if presented in a marker, leads to positive response by a user. For example, the campaign engine 224 can determine that users presented with information that an item of invitational content includes a free download are much more likely to select the invitational content than those who were not presented with that information.

Further, evaluating the features communicated by a marker allows the campaign engine 224 to accurately evaluate which attributes of an item of invitational content are viewed positively or negatively. For example, user response can be evaluated based on what information is presented to a user by a marker. The campaign engine 224 can thus determine whether user response increases or decreases based on a user being presented with certain features included in the invitational content. This type of evaluation can also take into account factors concerning the user terminal 202. For example, it can be determined that users are less likely to select invitational content including video when viewing content on a cellular phone using a 3G connection.

In some embodiments, the campaign engine 224 can be configured to test user responses to specific attributes. The campaign engine 224 can be configured to interact with the rules database to vary rules regarding assembling a marker to test particular attributes associated with invitational content. For example, the rules can require that a specific attribute always be communicated by a marker to test user response to the specific attribute. In some embodiments, multiple attributes can be tested against each other. For example, the rules can be configured to vary which attributes are communicated to a user such that certain attributes are not communicated together to test their response in comparison to others. For example, to determine which of two attributes is preferable to a user, the rules can be configured such that half of the items of invitational content that include both attributes includes a marker communicating one of the attributes while the other half communicates the other attribute. This way, user response to the specific attributes can be compared.

The campaign engine 224 can also be configured to provide the analyzed data to content providers 209 and/or 210. Content providers 209 and/or 210 can thus use the data to update their inventory forecasting accordingly. Content providers 209 and/or 210 can use the data to provide the right volume of correctly placed invitational content. For example, content providers 209 and/or 210 can adjust their inventory to include more content including features which were determined to positively affect user response or, conversely, reduce that amount of content including a feature determined to negatively affect user response. Further, inventory can be adjusted based on data regarding device capabilities of users as determined by the data. For example, if, from the data, it is determined that most users are connected via a 3G connection when requesting invitational content, content providers 209 and/or 210 can adjust their inventory to include more invitational content optimized for a 3G connection, or conversely, reduce the amount of content optimized for a WiFi connection.

In some embodiments, the campaign engine 224 can be configured to automatically adjust campaign inventory based on the analyzed data. For example, the campaign engine 224 can be configured to automatically adjust inventory based on predetermined rules or guidelines. In some embodiments, campaign inventory can be adjusted if the analyzed data indicates that a feature is chosen above or below a specified threshold. For example, if the data indicates that users are selecting invitational content including coupons 75% or more of the time, the campaign engine 224 can automatically adjust the inventory to include more invitational content including coupons. Alternatively, if a feature is selected below 25% of the time, the campaign engine 224 can adjust the inventory to offer invitational content that does not include the poor performing feature.

In some embodiments, inventory can be automatically adjusted based on the settings of the user terminal 202. For example, if the data indicates that 75% of users are requesting data while connected via a 3G connection, the campaign engine 224 can automatically adjust inventory to include more invitational content optimized for a 3G connection. Although percentages (25% and 75%) are used in the above example, one skilled in the art would recognize that any number of factors or combination thereof can be used as guidelines or rules to make these types of determinations.

The rules or guidelines can be established in multiple ways. For example, in some embodiments, the rules can be standard rules preset by the campaign engine 224. In some embodiments, content providers 209 and/or 210 can set the rules so that the inventory optimization is performed according to their specified preferences.

The analyzed data in regards to user preferences and device capabilities can also be used by other content providers 209 and/or 210 to optimize their inventory. For example, in some embodiments the data can be accessed by all content providers 209 and/or 210 from which content is delivered by the content delivery system. In some embodiments the campaign engine 224 can use data collected from delivering invitational content from multiple content providers 209 and/or 210 to provide overall statistics, rather than statistics gathered from the delivery of invitational content from only one content provider. The campaign engine 224 can also use the overall statistics when adjusting campaign inventory. For example, in some embodiments, the overall statistics can always be used by the campaign engine 224 when optimizing campaign inventory. In some embodiments, the content providers 209 and/or 210 can decide whether to have their campaign inventory optimized based on data relating to just their own campaign, the data collected from all campaigns or a subset thereof.

Figure 5:
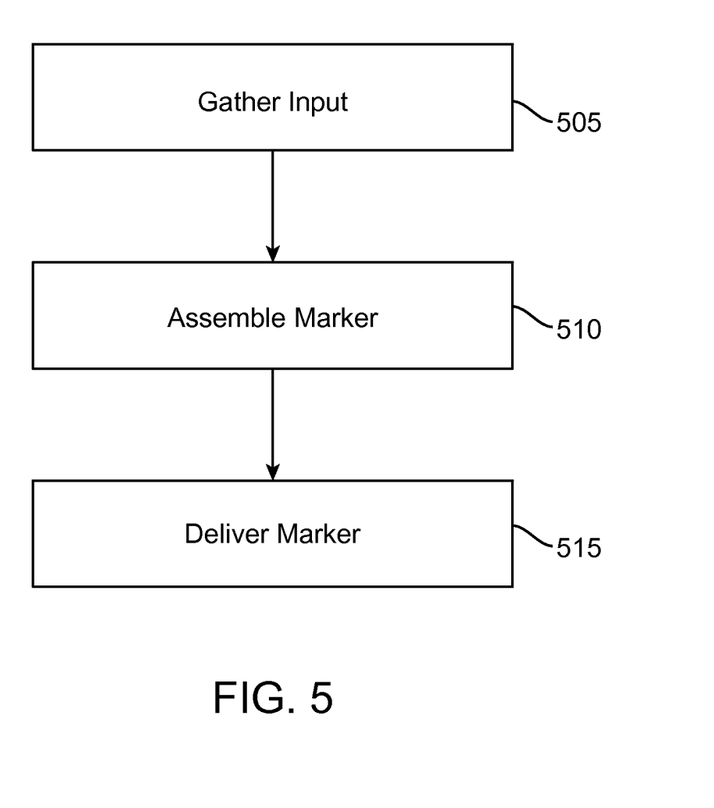
FIG. 5 illustrates an exemplary method embodiment of providing a marker with an item of invitational content.

FIG. 5 illustrates an exemplary method embodiment of providing a marker with an item of invitational content. As illustrated at step 505, input is gathered. Input can be gathered from multiple data sources, as previously discussed. For example, input can be gathered from an item of invitational content, a content provider, a user terminal, a database, or any other data source available to the marker module via the communication network.

The gathered input can be any type of data relating to performing an item of invitational content. For example, this can include data pertaining to the item of invitational content such as the content or technical specifications of performing the content. This can also include data pertaining to the user terminal which will perform the data such as the technical specifications of the user terminal or current settings of the user terminal. The gathered input can also relate to the content provider that provided the invitational content such as the name of the content provider and an expiration date associated with the invitational content. The gathered input can also relate to the user to be viewing the invitational content, such as the user's previous history regarding invitational content.

Once input has been gathered, the method then determines (i.e., assembles, develops) a marker 510 from the input. The marker can be determined according to a predefined arrangement embodied as a set of rules. These rules can specify what information a marker communicates based on the gathered input. This can include prioritizing data, pairing data, excluding data, etc. The rules can also dictate where and how information is communicated by the marker. For example, the rules can dictate the location of information in the marker, what images or text are used to communicate information, colors that can be used to communicate information, etc.

Once determined, the marker can then be delivered 515 to a user terminal along with an item of invitational content. The marker can be presented with the item of invitational content in any way. For example, in some embodiments the marker can be a graphical element displayed near the invitational content. In some embodiments the marker can be displayed as part of the invitational content.

Figure 6:
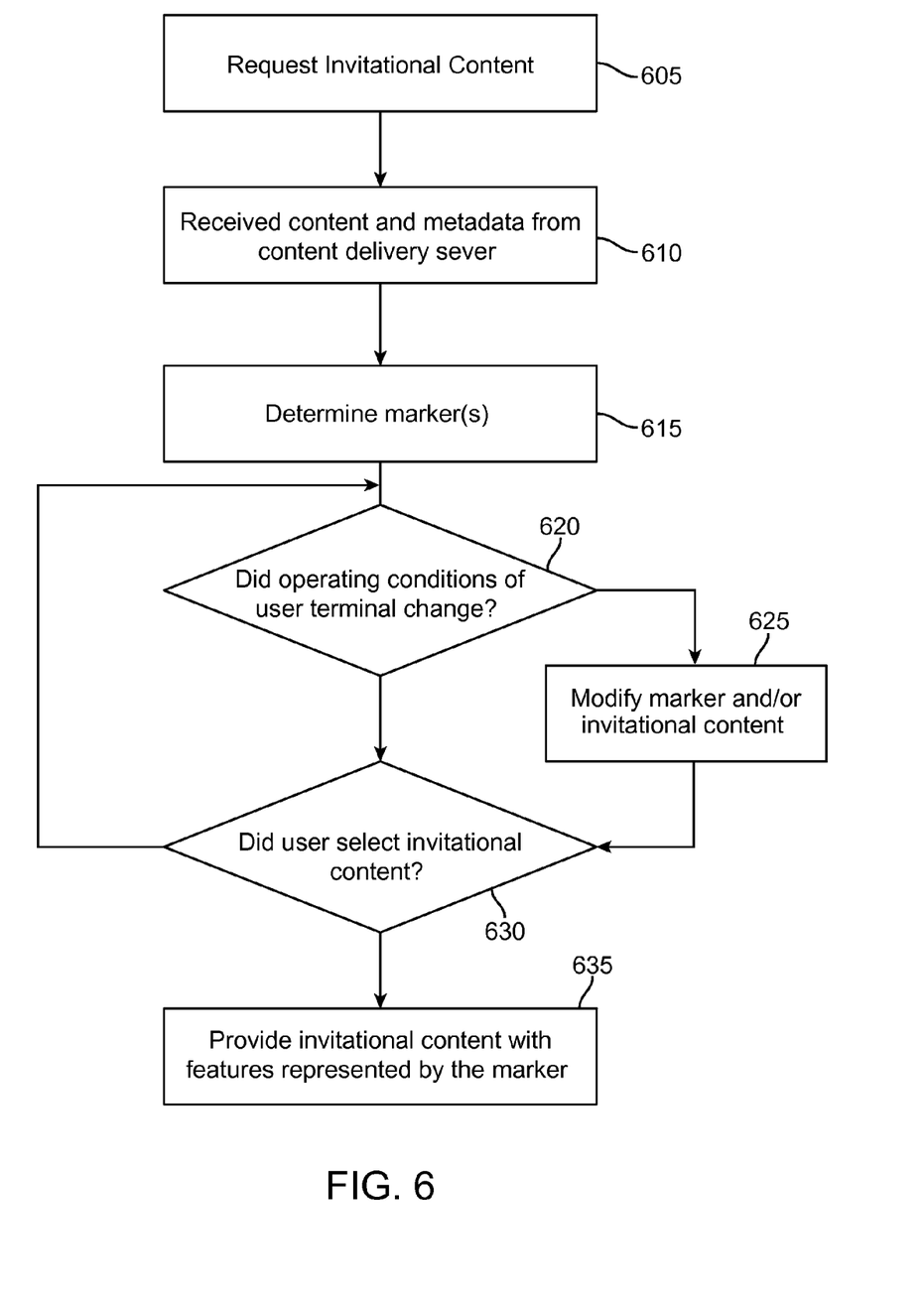
FIG. 6 illustrates an exemplary method embodiment of providing a marker with an item of invitational content in which the marker is selected for display at the user terminal.

FIG. 6 illustrates an exemplary method embodiment of an item of invitational content provided to a user terminal wherein the user terminal includes logic for determining which invitational content features should be enabled base on the current operating conditions of the user terminal. One or more markers can also be provided to indicate the features of the item of invitational content to a user. As illustrated, a user terminal can request an item of invitational content 605. This can include sending a request to a content delivery system in network communication with the user terminal. Along with the request the user terminal can also send input regarding the current operating conditions of the user terminal such as the current network connection, volume settings, etc.

Upon receipt of the request, the content delivery system can select the appropriate content to be provided to the user terminal. The requested content as well as metadata regarding features of the invitational content can be delivered to the user terminal 610.

In some embodiments, the content is provided in a modular manner comprising fixed and variable content blocks. The content blocks can be assembled according to rules which dictate which blocks are to be selected and how they should be combined. In some embodiments, the rules can dictate that metadata delivered with the invitational content as well as input regarding the user terminal be considered in assembling the invitational content.

In some embodiments, the entire invitational content can be delivered to the user terminal. In some embodiments only part of the invitational content can be returned to the user along with links to additional content or metadata describing the entire invitational content. For example, invitational content can include an initial view as well as a subsequent view. An example of this can be a banner advertisement that, when clicked, provides the user with a rich media ad. In another example, the initial view of the invitational content can be an application, and the subsequent view can be additional content downloaded from the Internet. In still yet another example, the initial view of the invitational content can be a web page, and the subsequent view can be additional content available in linked pages (either cached or available via download). Those skilled in the art will appreciate that all sorts of content can have an initial view and a subsequent view.

Using the example of an advertisement given above, the banner advertisement can be the initial view that, when selected, can provide the user with the subsequent view of the rich media ad.

Although only an initial view is sent, the metadata regarding the entirety of the invitational content can be delivered. The metadata can also include data about all available variants of the subsequent views of the invitational content.

Upon receiving the invitational content and the associated metadata from the Content Delivery System, the user terminal can determine a marker 615 to be provided with the initial view of the invitational content which communicates features associated with the subsequent view(s) of the invitational content to the user. The marker can be determined according to rules which can specify what features are to be communicated as well as how and where they are to be communicated.

In some embodiments, the rules for assembling the marker can be integrated with the rules for assembling an item of invitational content. For example, the rules for assembling an item of invitational content can dictate that certain variants of invitational content should be automatically selected and provided to a user depending on, for example, input gathered from the user terminal. For example, if a user terminal has a low bandwidth connection at the time the initial view of the invitation content is presented, the rules can dictate that a less resource intensive variant of the invitational content be presented. For example, the rules can dictate that a variant that does not include video be selected rather than a variant that does include video. In such an instance, the initial view of the invitational content would not be accompanied by a marker indicating that a video is a feature of a subsequent view.

In such embodiments wherein the invitational content can be dynamically modified based on the current operating conditions of the user terminal, the user device can include the necessary logic to determine which features to disable/enable. However, the subsequent views of the invitational content might still be located on the content delivery server. In such instances, the user terminal can inform the content delivery server of the change in condition or request the subsequent views with/without the enabled/disabled feature.

In some embodiments, the features communicated by the determined marker can be stored in a database for reporting purposes. For example, in some embodiments, the communicated features can be communicated to the content delivery system via a communications network and stored in a marker database. In some embodiments, the data can be stored locally on the user terminal. In some embodiments, the operating condition of the user terminal can change after the invitational content has been assembled and displayed along with an initial view of the invitational content and accompanying markers. In such embodiments, a feature of the invitational content can dynamically be disabled or enabled according to the change in operating conditions. In such embodiments, a module on the user terminal can monitor operating conditions and cause features to become enabled or disabled accordingly. For example, a user terminal connected via a 3G network can change to be connected via Wi-Fi network. To account for this, the method checks whether a user terminal setting has changed 620. When the operating condition is determined to have changed, the invitational content and/or marker can be modified 625 accordingly. As the features of available in the subsequent views dynamically change, so too can the markers presented along with the initial view of the invitational content.

The method next determines whether a user has selected the item of invitational content 630. The invitational content can be selected in any way, for example, by the user clicking on the initial view of the invitational content. If selected, the invitational content can be provided to the user 635. This can include the invitational content being assembled according to the rules for assembling invitational content. If the user does not select the item of invitational content, the method returns to step 620.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

We claim:

1. A computer implemented method comprising:
   receiving, by a user terminal, an item of invitational content including an initial content view that is configured to be presented before a subsequent content view that includes at least one content feature corresponding to the invitational content that can be enabled in the subsequent content view, the at least one content feature comprising a content item configured to be presented as part of the subsequent content view when enabled;
   receiving, by the user terminal, metadata describing the at least one content feature in the subsequent content view and metadata describing a rule indicating a maximum number of graphical indications that may be associated with the invitational content;
   presenting based on the rule, by the user terminal, the initial content view modified to include a graphical indication of the at least one content feature prior to a presentation of the subsequent content view.

2. The computer implemented method of claim 1, wherein the at least one content feature in the subsequent content view comprises at least one of a video feature and an audio feature.

3. The computer implemented method of claim 1, wherein the at least one content feature comprises a plurality of content features and the graphical indication comprises corresponding graphical indications, and the method further comprising, for each of the plurality of features, making a separate determination as to whether the current operating condition of the user terminal is appropriate for inclusion of each of the plurality of features.

4. The computer implemented method of claim 2, further comprising: presenting the subsequent content view comprising the content item having at least one of the video feature and the audio feature.

5. The computer implemented method of claim 1, wherein the determination that a current operating condition of the user terminal is appropriate for inclusion of the at least one content feature is based on a type of internet connection being used by the user terminal.

6. The computer implemented method of claim 1, wherein the determination that a current operating condition of the user terminal is appropriate for inclusion of the at least one content feature is based on user selected settings associated with the user terminal.

7. The computer implemented method of claim 1, wherein the determination that a current operating condition of the user terminal is appropriate for inclusion of the at least one content feature is based on a location of the user terminal.

8. The computer implemented method of claim 1, wherein the determination that a current operating condition of the user terminal is appropriate for inclusion of the at least one content feature is based on a type of user terminal.

9. The computer implemented method of claim 1, further comprising: storing data indicating what content features were included in the graphical indication in a reporting database, wherein the reporting database also contains data indicative of all invitational content requested by, and delivered to, the user terminal.

10. The computer implemented method of claim 9, wherein the data stored in the reporting database is used to determine user response to invitational content based on what content features the user was made aware of by the graphical indication.

11. The computer implemented method of claim 1, wherein the metadata corresponds to an application programming interface understood by an operating system of the user terminal.

12. A system comprising a user terminal, the user terminal comprising:
a processor; and
a non-transitory computer-readable storage medium having stored therein instructions which, when executed by the processor, cause the processor to perform operations comprising:
receiving, an item of invitational content including an initial content view and a subsequent content view that is configured to be presented after the initial content view, the item of invitational content being accompanied by metadata, the metadata describing at least one content feature in the subsequent content view in the item of invitational content, the metadata further describing a rule indicating a maximum number of graphical indications that may be associated with the invitational content, the at least one content feature to be enabled in the subsequent content view, the at least one content feature comprising a content item configured to be presented as part of the subsequent content view when enabled;
presenting, based on the rule, the initial content view modified to include a graphical indication of the at least one content feature prior to a presentation of the subsequent content view.

13. The system of claim 12, wherein the non-transitory computer-readable storage medium stores additional instructions which, when executed by the processor, result in an operation further comprising:
prior to presenting the graphical indication, determining that the current operating condition of the user terminal is appropriate for inclusion of the at least one content feature.

14. The system of claim 13, wherein
the at least one content feature in the subsequent content view comprises at least one of a video feature and an audio feature.

15. The system of claim 13, wherein the at least one content feature comprises a plurality of content features, and wherein for each of the plurality of content features, a separate determination is made as to whether the current operating condition of the user terminal is appropriate for inclusion of each of the plurality of content features.

16. The system of claim 14, wherein the non-transitory computer-readable storage medium stores additional instructions which, when executed by the processor, result in an operation further comprising:
presenting the subsequent content view comprising the content item having at least one of the video feature and the audio feature.

17. The system of claim 13, wherein the determination that a current operating condition of the user terminal is appropriate for inclusion of the at least one content feature is based on a type of internet connection being used by the user terminal.

18. The system of claim 13, wherein the determination that a current operating condition of the user terminal is appropriate for inclusion of the at least one content feature is based on user selected settings associated with the user terminal.

19. The system of claim 13, wherein the determination that a current operating condition of the user terminal is appropriate for inclusion of the at least one content feature is based on the location of the user terminal.

20. The system of claim 13, wherein the determination that a current operating condition of the user terminal is appropriate for inclusion of the at least one content feature is based on the type of user terminal.

21. The system of claim 12, wherein the non-transitory computer-readable storage medium stores additional instructions which, when executed by the processor, result in an operation further comprising:
storing data indicating what content features were included in the graphical indication in a reporting database, wherein the reporting database also contains data indicative of all invitational content requested by, and delivered to, a user terminal.

22. The system of claim 21, wherein the data stored in the reporting database is used to determine user response to invitational content based on what features the user was made aware of by the graphical indication.

23. The system of claim 12, wherein the metadata corresponds to an application programming interface understood by an operating system of the user terminal.

24. A non-transitory computer-readable storage medium storing instruction which, when executed by a computing device, cause the computing device to perform operations comprising:

receiving by a user terminal, an item of invitational content including an initial content view and a subsequent content view, the item of invitational content being accompanied by metadata, the metadata describing at least one content feature in the subsequent content view in the item of invitational content, the metadata further describing a rule indicating a maximum number of graphical indications that may be associated with the invitational content, the at least one content feature configured to be enabled in the subsequent content view, the at least one content feature comprising a content item configured to be presented as part of the subsequent content view when enabled;

selecting, by the user terminal, based on the metadata and a current operating condition of the user terminal, a first variant from the plurality of variants of the subsequent content view that is appropriate for inclusion of the at least one content feature; and presenting based on the rule, by the user terminal, as part of the initial content view, a graphical indication of the at least one content feature prior to a presentation of the selected first variant of the plurality of variants of the subsequent content view.

25. The non-transitory computer readable medium of claim 24, wherein the at least one content feature in the selected subsequent content view comprises at least one of a video feature and an audio feature.

26. The non-transitory computer readable medium of claim 24, wherein the at least one content feature comprises a plurality of content features, and for each of the plurality of content features, a separate determination is made as to whether the current operating condition of the user terminal is appropriate for inclusion of each of the plurality of content features.

27. The non-transitory computer readable medium of claim 25, storing additional instructions which, when executed by the processor, result in an operation further comprising:
presenting the selected subsequent content view comprising the content item having at least one of the video feature and the audio feature.

28. The non-transitory computer readable medium of claim 24, wherein the determination that a current operating condition of the user terminal is appropriate for inclusion of the at least one content feature is based on the type of internet connection being used by the user terminal.

29. The non-transitory computer readable medium of claim 24, wherein the determination that a current operating condition of the user terminal is appropriate for inclusion of the at least one content feature is based on user selected settings associated with the user terminal.

30. The non-transitory computer readable medium of claim 24, wherein the determination that a current operating condition of the user terminal is appropriate for inclusion of the at least one content feature is based on the location of the user terminal.

31. The non-transitory computer readable medium of claim 24, wherein the determination that a current operating condition of the user terminal is appropriate for inclusion of the at least one content feature is based on the type of user terminal.

32. The non-transitory computer readable medium of claim 24, storing additional instructions which, when executed by the processor, result in an operation further comprising:
storing data indicating what content features were included in the graphical indication in a reporting database, wherein the reporting database also contains data indicative of all invitational content requested by, and delivered to, a user terminal.

33. The non-transitory computer readable medium of claim 32, wherein the data stored in the reporting database is used to determine user response to invitational content based on what features the user was made aware of by the graphical indication.

34. The non-transitory computer readable medium of claim 24, wherein the metadata corresponds to an application programming interface understood by an operating system of the user terminal.

35. The computer implemented method of claim 1, further comprising:
in response to determining that the current operating condition of the user terminal is not appropriate for the at least one content feature,
requesting a second subsequent content view that does not include the at least one content feature.

36. A computer implemented method comprising:
receiving, by a user terminal, an item of invitational content including an initial content view that is configured to be presented before a subsequent content view of the invitational content that includes at least one content feature that is associated with the subsequent content view, the at least one content feature comprising a content item to be presented as part of the subsequent content view;
receiving, by the user terminal, metadata describing the at least one content feature in the subsequent content view, metadata describing available variants of the subsequent content view, and metadata describing a rule indicating a maximum number of graphical indications that may be associated with the invitational content;
presenting based on the rule, by the user terminal, the initial content view modified to include a graphical indication of the at least one content feature prior to a presentation of the subsequent content view.

* * * * *